United States Patent [19]

Jardine

[11] Patent Number: 4,923,609
[45] Date of Patent: May 8, 1990

[54] METHOD AND APPARATUS FOR PURIFYING LIQUIDS EMPLOYING A PARTICULATE FILTER AND A MEMBRANE

[75] Inventor: Douglas M. Jardine, Colorado Springs, Colo.

[73] Assignee: Bio, Inc., Colorado Springs, Colo.

[21] Appl. No.: 196,932

[22] Filed: May 20, 1988

[51] Int. Cl.⁵ .............................................. B01D 13/00
[52] U.S. Cl. .................................. 210/636; 210/295; 210/321.69
[58] Field of Search .................. 210/636, 652, 321.69, 210/295, 316, 795, 317

[56] References Cited

U.S. PATENT DOCUMENTS

| | | | |
|---|---|---|---|
| 3,436,260 | 4/1969 | Duff | 210/795 X |
| 3,498,909 | 3/1970 | Littman | 210/23 |
| 3,505,215 | 4/1970 | Bray | 210/22 |
| 3,827,976 | 8/1974 | Stana et al. | 210/23 |
| 3,836,458 | 9/1974 | Wallis et al. | 210/23 |
| 3,912,624 | 10/1975 | Jennings | 210/409 X |
| 4,169,789 | 10/1979 | Lerat | 210/259 X |
| 4,198,293 | 4/1980 | Ogawa et al. | 210/353 X |
| 4,366,063 | 12/1982 | O'Connor | 210/652 |
| 4,636,307 | 1/1987 | Inoue et al. | 210/295 X |

*Primary Examiner*—Frank Spear
*Attorney, Agent, or Firm*—Sheridan, Ross & McIntosh

[57] ABSTRACT

A method and apparatus of purifying contaminated liquids employing a particulate filter and a membrane in combination. The particulate filter and membrane are disposed in a unitary container with the membrane being located downstream of the particulate filter. During the process of purifying a contaminated liquid, the membrane causes a back pressure to be exerted on the particulate filter thereby providing substantially even flow of liquid through the particulate filter and minimizing problems associated with uneven flow such as channeling, piping, purging and tunneling. An improved method for cleaning the liquid purification apparatus is also disclosed. The cleaning method preferably employs a gas such as air for scouring the particulate filter and the membrane in a single operation.

49 Claims, 1 Drawing Sheet

METHOD AND APPARATUS FOR PURIFYING LIQUIDS EMPLOYING A PARTICULATE FILTER AND A MEMBRANE

FIELD OF THE INVENTION

The present invention relates to the purification of contaminated liquids, and more specifically to purification utilizing a particulate filter and a membrane in combination in a single unit.

BACKGROUND OF THE INVENTION

A number of techniques have been used for liquid purification including: filtration, chemical sterilization, oxygenation, chemical flocculation, ultraviolet sterilization, and reverse osmosis.

Prior processes have used combinations of the above mentioned purification techniques. For example, U.S. Pat. No. 3,505,215 by Bray, issued Apr. 7, 1970, discloses the use of a vessel containing a spiral wound reverse osmosis membrane preceded and followed by vessels containing filters. U.S. Pat. No. 4,169,789 by Lerat, issued Oct. 2, 1979, discloses a sea water purification process whereby the water is pumped through a series of four or more separate filters at a relatively low pressure and then into a separate reverse osmosis unit at a relatively high pressure. U.S. Pat. No. 4,366,063 by O'Connor, issued Dec. 28, 1982, discloses a water recovery process for oil field muds that uses an oil/water separator followed by a filtration/adsorption unit to remove solids and hydrocarbons. The filtration/adsorption unit can contain a filter for further removal of solids and an adsorbant, such as charcoal or granular anthracite, for removal of small amounts of hydrocarbon remaining in the water stream after passing through the oil/water separator. The water then passes to a reverse osmosis unit. U.S. Pat. No. 3,836,458 by Wallis, et al., issued Sept. 17, 1974, discloses a water purification method and apparatus using various filters, including carbon filters, cellulose acetate filters and a reverse osmosis membrane. U.S. Pat. No. 3,498,909 by Littman, issued Mar. 3, 1970, discloses a device for desalination wherein a plurality of porous glass tubes are utilized. Littman also discloses the use of a reverse osmosis membrane upstream of the glass tubes.

When particulate filters are used in purifying a liquid, problems caused by uneven flow through the filters are common. Uneven flow of a contaminated liquid through a particulate filter can result in channels developing in the filter. The channels allow solids and other contaminants normally removed by the filter to substantially bypass the particulate filter material and pass through the unit with the liquid to be recovered. The above-mentioned prior processes do not address or attempt to solve the problem of uneven flow of a contaminated liquid through a particulate filter.

The aforementioned references disclose the use of multiple vessels for holding various types of filters and reverse osmosis membranes as well as the necessary pipes and pumps for moving a contaminated liquid from vessel to vessel. Multiple vessel systems can be cumbersome and expensive due to the number of individual pieces of equipment involved.

Another problem with the devices disclosed in the above cited references is the length of time required for periodic shut downs. Filter devices for purifying contaminated liquids require shutdown in order for filters and/or membranes to be cleaned. Cleaning of filters and membranes is commonly accomplished through back washing or reversing the flow through the system to physically remove contaminants built-up on the filters, as disclosed in Bray, Lerat, and O'Connor. Air scouring has also been used for cleaning particulate filters.

Prior processes for cleaning reverse osmosis membranes include, for example, use of a non-ionic surfactant in combination with a sodium or potassium salt and mineral acid, as disclosed in U.S. Pat. No. 3,827,976, by Stana, et al., issued July 11, 1972. U.S. Pat. No. 3,912,624 by Jennings, issued Oct. 14, 1975, discloses a method for cleaning reverse osmosis membranes whereby pressurized air is applied to the upstream side of the membrane causing impaction of water droplets thereby dislodging deposits on the membrane. U.S. Pat. No. 4,198,293 by Ogawa, et al., issued Apr. 15, 1980, discloses a method for cleaning reverse osmosis membranes in a tubular apparatus by introducing elastic elements to rub off accumulated deposits.

In prior processes the shut down of one purification unit for cleaning effectively shuts down the entire purification process unless duplicate units are used. For example, O'Connor provides for the use of alternate filtration/adsorption units so that one can be backwashed while the other is in operation thereby preventing shut down of the entire process during cleaning.

Therefore, it would be advantageous to provide a purification apparatus which minimizes the problems associated with uneven flow of contaminated liquid through a particulate filter. It would also be advantageous to minimize the complexity and costs associated with a purification apparatus. Furthermore, it would be advantageous if the cleaning of the apparatus could be accomplished with minimum amount of downtime. It would especially be advantageous if all components could be cleaned in a single operation. Additionally, it would be advantageous if the cleaning process were highly efficient in cleaning the various components associated with the apparatus.

SUMMARY OF THE INVENTION

The present invention includes a method for purifying contaminated liquids through the use of a particulate filter and a membrane, preferably a reverse osmosis membrane, which cooperate resulting in substantially even flow of contaminated liquid through the particulate filter. The method also includes procedures for cleaning the particulate filter and membrane in a single operation. A cleaning fluid is employed during the cleaning operation. Preferably, a scouring gas is introduced both in the cleaning fluid and on the outlet side of the membrane.

The invention also includes an apparatus for filtering contaminated liquid. The apparatus comprises a single container having both a particulate filter and a membrane, preferably a reverse osmosis membrane. The particulate filter and the membrane are disposed so that the membrane, located downstream of the particulate filter, provides a back pressure against the particulate filter which results in substantially even flow of the contaminated liquid through the particulate filter and minimizes channeling.

In a preferred embodiment, the apparatus can include means for distributing gas into a cleaning fluid. The gas improves the effectiveness of the cleaning fluid in cleaning the filter and scouring the underside of the membrane. During cleaning, gas can also be introduced on the outlet side of the membrane. The gas introduced on the outlet side of the membrane reverses the flow of liquid through the membrane thereby dislodging contaminants in the membrane, and causes foaming to occur along the inlet side of the membrane which serves to further clean and scour the membrane.

The apparatus of the instant invention is constructed to minimize the problem of uneven flow through a particulate filter. The apparatus minimizes uneven flow due to the cooperation of a particulate filter and a reverse osmosis membrane located in a single container. The reverse osmosis membrane is positioned relative to the particulate filter to create a substantially even back pressure on the exposed surface of the particulate filter preventing uneven flow of a contaminated liquid through the filter.

This invention involves the use of a single tank containing both a particulate filter and a reverse osmosis membrane. This arrangement capitalizes on the cost and space savings of having one vessel rather than multiple vessels required by prior processes.

The instant invention embodies an apparatus in which the cleaning of the particulate filter and reverse osmosis membrane located in a single vessel can be coordinated. Simultaneous cleaning of the filter and the membrane, when no duplicate unit is contemplated, provides for the most efficient use of downtime for cleaning.

A preferred embodiment of the instant invention provides for simultaneous cleaning of the membrane as well as the particulate filter with gas scouring. Gas is introduced with a cleaning fluid below the particulate filter in the typical fashion known to those skilled in the art. After scouring the particulate filter material, the gas rises to the inlet side of the membrane and scrubs it. In addition, the instant invention provides for the introduction of gas to the outlet side of the membrane, thereby reversing the fluid flow in the membrane and dislodging contaminants. The gas introduced on the outlet side also agitates the fluid in the membrane causing foaming to occur along the inlet side of the membrane, which serves to further scrub the membrane. The use of gas results in an efficient and effective cleaning process.

BRIEF DESCRIPTION OF THE DRAWINGS

The features of the present invention which are believed to be novel are set forth with particularity in the appended claims. The invention may best be understood by reference to the following description taken in conjunction with the accompanying drawings in which:

DETAILED DESCRIPTION

Figure 1:
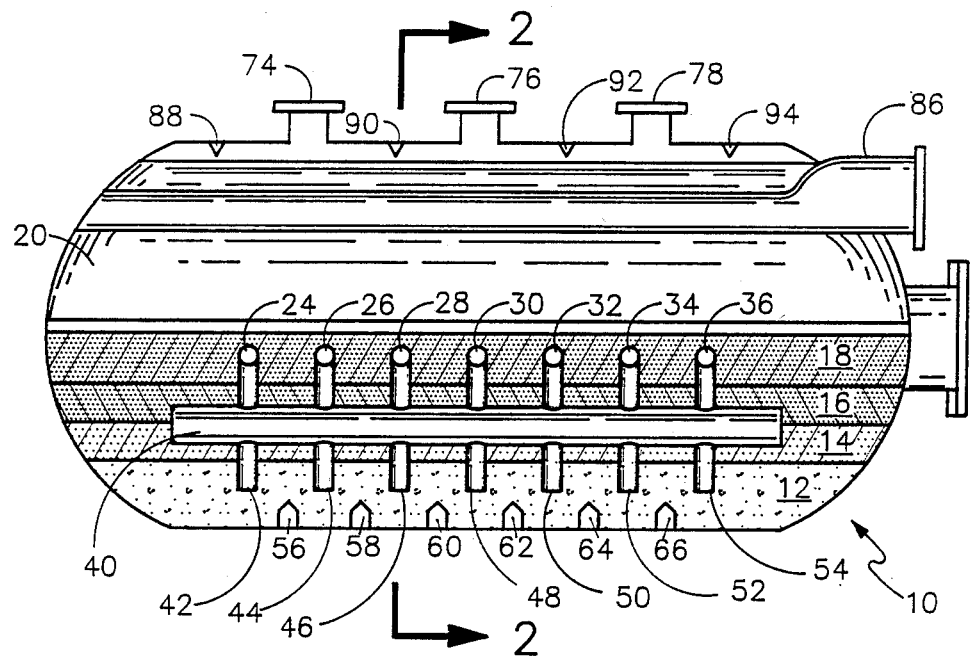
FIG. 1 is a cross-sectional side view taken along line 1—1 of FIG. 2 of a preferred embodiment of the present liquid purification apparatus.

The present invention embodies a process for purification of a contaminated liquid and an apparatus for carrying out the process. The apparatus comprises a container housing both a particulate filter and a membrane. Preferably, the membrane is a reverse osmosis membrane, but it could also be another type of membrane, such as an ultrafiltration membrane. The membrane is positioned downstream of the particulate filter. The force required to cause liquid to flow through the membrane or to overcome osmotic pressure provides a back pressure against the particulate filter. This back pressure is applied substantially evenly across the exposed surface of the particulate filter that faces the membrane. Sufficient back pressure results in a substantially even flow of contaminated liquid through the particulate filter. Thus, the problem of poor filtration due to uneven flow through the particulate filter is minimized. The amount of back pressure is a function of the thickness of the membrane, the pore size of the membrane, the hydraulic pressure against the membrane provided by the flow of contaminated liquid into the container, the composition of the contaminated liquid and, in the case of a reverse osmosis membrane, the osmotic pressure of the purified liquid. The instant invention also provides for simultaneous cleaning of the membrane and the particulate filter.

The apparatus embodied by the instant invention comprises a container for holding a particulate filter and a membrane. The container can be made of any suitable material known to those skilled in the art. Interior surfaces of the container and inlet and outlet means can be coated with any suitable material, depending on the type of contaminated liquid to be purified and the use contemplated for the recovered filtrate. For example, when the apparatus is being used for purification of a contaminated liquid to provide potable water, preferred coatings include synthetic rubbers such as neoprene, electrolytical deposits and metal cladding, and most preferably non-toxic plastics and paints.

The container can also be constructed to handle varying amounts of operating pressure. However, maximum operating pressure will typically be limited by the characteristics of the membrane and the pressure drop across the membrane. Typically the operating pressure for purification of a contaminated liquid is between about 30 psig and about 2000 psig. When the contaminated liquid is sea water, the operating pressure is preferably about 700 to about 2000 psig, and most preferably about 900 psig. When the contaminated liquid is brackish water, the operating pressure is preferably about 30 psig to about 150 psig, and most preferably about 30 psig. As used herein, "brackish water" means water with about 1,000 to about 15,0000 milligrams dissolved salts per liter.

The particulate filter for use in the container is preferably located in the bottom portion of the container so that contaminated liquid can be introduced to the bottom of the container and pumped upwardly through the particulate filter. The filter can be composed of multiple layers of various materials known to those skilled in the art such as gravel, sand, anthracite or other carbonaceous materials, green sand and various plastic and porcelain materials.

When potable water is to be recovered from a contaminated liquid, at least one layer and preferably four layers of particulate filter material are used to form the particulate filter. Types of material can include those materials listed hereinabove as well as other materials used to produce specific desired results. The particulate filter of the instant application preferably comprises 4 layers, with a bottommost layer composed of filter rock with an average diameter of about 30 to about 65 millimeters, a second layer of quartz filter sand with an average diameter of about 15 to about 35 millimeters situated above and contingent to the filter rock layer, a third layer of quartz filter sand with an average diameter of about 1 to about 4 millimeters above and contingent to the second layer, and a fourth layer of anthracite with an average diameter of about 1 to about 4 millimeters forming the uppermost layer of the particulate filter.

The container also contains a membrane, preferably a reverse osmosis membrane, located in the upper portion of the container and positioned over the particulate filter. The membrane is used for further purification of the contaminated liquid. The membrane utilized in the instant invention is preferably in a sheet-like form. A sheet membrane is desirable so that when it is affixed in the container above the particulate filter it can provide a substantially even back pressure across the uppermost surface of the particulate filter. Such back pressure is achieved due to the restricted flow of fluid through the membrane. This minimizes problems associated with uneven flow through the particulate filter, such as channeling. Although reverse osmosis membranes are preferred in the present invention, other membranes, such as ultrafiltration membranes, may be employed as long as suitable back pressure is provided.

Membranes have an "inlet" and an "outlet" side. The inlet side of a membrane is the side first contacted by, in this case, a contaminated liquid. The outlet side is the side where a filtered liquid exits the membrane. In the instant invention, the inlet side of the membrane faces the top surface of the particulate filter. The outlet side faces the interior surface of the upper walls of the container.

The membrane of the instant invention preferably has a pore size smaller than the smallest material size comprising the particulate filter. This prevents filter material from flowing through the membrane and contaminating the filtrate to be recovered. Membranes for the purification of contaminated liquids can be of any type known to those skilled in the art, as long as they provide sufficient back pressure.

Now referring specifically to FIGS. 1 and 2, the process and apparatus of a preferred embodiment of the present invention will be described in detail.

Referring to FIG. 1, a container 10 houses layers of particulate filter material 12, 14, 16 and 18 and membrane 20. In operation the contaminated liquid to be filtered is introduced through inlet means 24, 26, 28, 30, 32, 34 and 36 and directed to a means for distribution 40 of the contaminated liquid into the bottom portion of the container 10 through header outlets 42, 44, 46, 48, 50, 52 and 54. Valves, such as ball valves (not shown), can be employed in conjunction with the inlet means 24, 26, 28, 30, 32, 34 and 36 in order to help equalize the flow of liquid to the header outlets 42, 44, 46, 48, 50, 52 and 54. Located under the distribution means 40 for the contaminated liquid are first means for distributing a gaseous material 56, 58, 60, 62, 64 and 66 which are employed during the cleaning operation, which will be discussed in greater detail hereinafter.

After the contaminated liquid has been introduced into the bottom of the container 10 through the header outlets 42, 44, 46, 48, 50 52 and 54, the contaminated liquid is forced upwardly through the particulate filter layers 12, 14, 16 and 18 due to the hydraulic pressure provided by the continuous flow of contaminated liquid provided at the inlets 24, 26, 28, 30, 32, 34 and 36.

Figure 2:
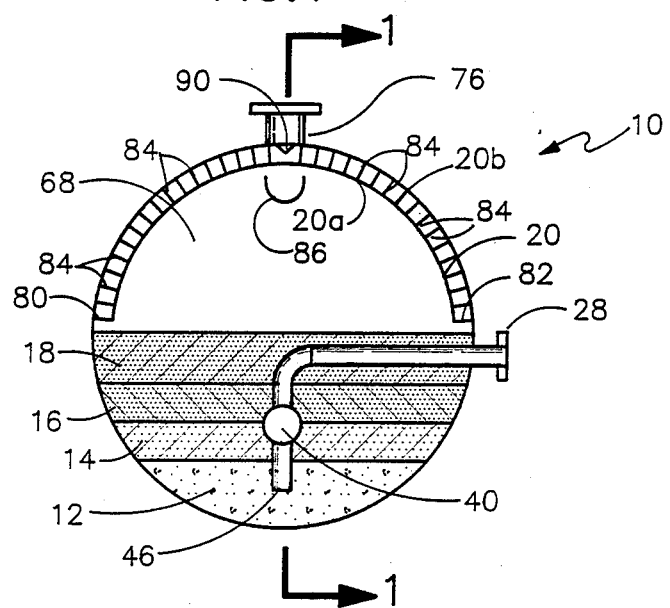
FIG. 2 is a cross-sectional end view of the apparatus of FIG. 1 taken along line 2—2 of FIG. 1.

FIG. 2 illustrates the layers of material 12, 14, 16 and 18 used to make up the particulate filter in the preferred embodiment of this invention. Contaminants in the contaminated liquid adhere to the particulate material as the contaminated liquid is pumped therethrough. In a preferred embodiment, the first layer 12 of particulate material with which the contaminated liquid comes into contact is a filter rock layer. Preferably the filter rock has an average diameter within the range of about 30 to about 65 millimeters. The second layer 14 preferably comprises quartz filter sand having an average diameter of about 15 to about 35 millimeters. The third layer 16 preferably comprises quartz filter sand having an average diameter of about 1 to about 4 millimeters. The fourth layer 18 preferably comprises a carbonacious filter material such as anthracite, preferably having an average diameter within the range of about 1 to about 4 millimeters.

After the contaminated liquid passes through the particulate filter layers 12, 14, 16 and 18, it exits into the space 68 above the particulate filter and below the membrane 20 as a first filtrate. The first filtrate has substantially fewer contaminants than prior to its passing through the particulate filter layers 12, 14, 16 and 18.

The membrane 20 has a flow inlet side 20a which is disposed towards the interior of the container 10 so that the first filtrate is in contact with said inlet side 20a. The membrane has an outlet side 20b which is that side facing the interior walls of the container 10 and from which a second filtrate exits and is recovered from the outlet means 74, 76 and 78.

The membrane 20 is interfaced with the container at outermost points 80 and 82 and at points therebetween in such a manner as to properly support the membrane 20 under desired operating pressures. The membrane is preferably supported on the outlet side 20b by an outer support structure 84. In the embodiment shown in FIG. 2, the outer support structure comprises members in which one edge of each member is attached to the container 10 sidewall, and the other edge supports the membrane 20. This support structure 84 can be constructed of any suitable material such as metal strapping, and can be, for example, honeycomb-shaped. Channels (not shown) are provided in the outer support structure 84 to provide for the flow of liquid toward the outlet means 74, 76 and 78. The inlet side 20a is supported by an inner support structure such as metal strapping (not shown). As will be appreciated by those skilled in the art, the membrane 20 is thus supported between the inner support structure and the outer support structure 84. The membrane 20 is attached to the container 10 at points 80 and 82 to prevent first filtrate from bypassing the membrane during the purification cycle and for preventing gas from bypassing the membrane 20 during the cleaning cycle.

The membrane 20 is positioned above the particulate filter layers 12, 14, 16 and 18 to minimize problems associated with uneven flow of contaminated liquid through the particulate filter due to the restricted diffusion or flow of the first filtrate through the membrane 20. This restricted diffusion or flow through the membrane 20 above the particulate filter layers 12, 14, 16 and 18 provides a back pressure against the particulate filter layers 12, 14, 16 and 18 which reduces problems such as channeling or piping in the particulate filter layers 12, 14, 16 and 18. The membrane 20 must also be disposed to allow for expansion of the particulate filter layers 12, 14, 16 and 18 during cleaning cycles. During cleaning, the volume of the particulate filter layers 12, 14, 16 and 18 can increase by up to about 30% or more.

Referring to FIG. 1, during the cleaning procedure, cleaning fluid is introduced through inlet means 24, 26, 28, 30, 32, 34 and 36 and a gas is introduced through the first gas inlet means 56, 58, 60, 62, 64 and 66 into the cleaning fluid. The gas can be any process inert gas which will not contaminate the particulate filter layers 12, 14, 16 and 18 or the membrane 20 and may include, but is not limited to, argon, carbon dioxide, air and mixtures thereof, and is preferably air. As the fluid and the gas rise through the particulate filter layers 12, 14, 16 and 18, the filter layers expand and gas bubbles scour the particulate materials. After rising above the expanded filter layers 12, 14, 16 and 18, the bubbles rise to the inlet side 20a of the membrane 20 and scrub and scour it. As additional cleaning fluid is introduced into the container 10 through the inlet means 24, 26, 28, 30, 32, 34 and 36, cleaning fluid, along with contaminants suspended therein, is carried out of the container 10 via a cleaning fluid removal means 86 positioned above the particulate filter layers 12, 14, 16 and 18 and below the membrane 20. The removal means 86 for the cleaning fluid can be, for example, a half section pipe or trough. The removal means 86 must be located so that during cleaning it is positioned above the particulate filter layers 12, 14, 16 and 18 in their expanded state. The removal means 86 is provided with a valve. The valve is open during the cleaning process, but closed during the filtering process in order to prevent first filtrate from existing container 10 prior to passing through membrane 20.

During cleaning a gas can also be introduced through second gas inlet means 88, 90, 92 and 94 located above the membrane 20. The gas creates pressure on the outlet side 20b of the membrane 20 and creates a reverse flow through the membrane 20 from the outlet side 20b to the inlet side 20a. The reverse flow dislodges contaminants in the membrane 20 and carries them into the cleaning fluid in the space 68 below the membrane 20 and above the particulate filter layer 18. The gas introduced above the membrane 20 also agitates cleaning fluid so that foaming may occur along the inlet side 20a of the membrane 20. The foaming aids in the cleaning of the inlet side 20a of the membrane 20 by dislodging contaminants that can then be carried out of the unit in the cleaning fluid via removal means 86.

While various embodiments of the present invention have been described in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. An apparatus for removing contaminants from a liquid, said apparatus comprising:
   (a) a container;
   (b) a particulate filter having an exposed surface disposed in said container; and
   (c) a membrane having an inlet side and an outlet side disposed downstream of said particulate filter such that back pressure resulting from forcing liquid through said membrane is exerted against said exposed surface of said particulate filter.

2. The apparatus of claim 1 wherein said membrane comprises a reverse osmosis membrane.

3. The apparatus of claim 1 wherein said membrane comprises an ultrafiltration membrane.

4. The apparatus of claim wherein said particulate filter comprises a plurality of particulate materials.

5. The apparatus of claim 4 wherein said plurality of particulate materials are arranged substantially in individual layers.

6. The apparatus of claim 1 wherein said particulate filter comprises one or more of the materials selected from the group consisting of anthracite, quartz sand, and filter rock.

7. The apparatus of claim 1 wherein said particulate filter comprises materials selected from the group consisting of anthracite having an average diameter of about 1 to about 4 millimeters, quartz sand having an average diameter of about 1 to about 4 millimeters, quartz sand having an average diameter of about 15 to about 35 millimeters, and filter rock having an average diameter of about 30 to about 65 millimeters.

8. The apparatus of claim 1 further comprising at least one inlet means for introducing contaminated liquid from outside said container to a location within said particulate filter.

9. The apparatus of claim 1 further comprising a plurality of inlet means for providing contaminated liquid to a location within said particulate filter.

10. The apparatus of claim 9 further comprising header means connecting said inlet means and providing fluid communication between said inlet means.

11. The apparatus of claim 1 further comprising at least one outlet means located downstream of said outlet side of said membrane.

12. The apparatus of claim 1 further comprising outlet means located downstream of said particulate filter and upstream of said inlet side of said membrane.

13. The apparatus of claim 1 wherein said container comprises a cylindrical container closed at both ends.

14. The apparatus of claim 1 wherein said container comprises a top portion and a bottom portion.

15. The apparatus of claim 14 wherein said particulate filter is disposed in said bottom portion and wherein said membrane is disposed in said top portion.

16. The apparatus of claim 14 further comprising inlet means for providing contaminated liquid initially located outside of said container to a location within said bottom portion of said container and within said particulate filter.

17. The apparatus of claim 14 further comprising first outlet means located downstream of said membrane and further located substantially at the uppermost portion of said container.

18. The apparatus of claim 14 further comprising second outlet means located downstream of said particulate filter and upstream of said membrane.

19. The apparatus of claim 18 wherein said second outlet means comprises a trough having a longitudinal axis disposed in the upper portion of said container so that said longitudinal axis of said trough is parallel to the longitudinal axis of said container and wherein the interior of said trough substantially faces said inlet side of said membrane and wherein the lower exterior portion of said trough faces said particulate filter.

20. The apparatus of claim further comprising first gas inlet means for introducing gas into the interior of said container within said particulate filter.

21. The apparatus of claim 14 further comprising first gas inlet means located within the bottom portion of said container for introducing gas within said particulate filter.

22. The apparatus of claim 1 further comprising second gas inlet means for introducing gas downstream of said membrane.

23. The apparatus of claim 1 further comprising an opening located in a wall of said container for accessing and servicing the interior of said container.

24. The apparatus of claim further comprising support means for supporting said membrane.

25. The apparatus of claim 24 wherein said support means are attached to an interior sidewall of said container.

26. The apparatus of claim 1 wherein said membrane is located a distance from said particulate filter in order to allow for expansion of said particulate filter.

27. The apparatus of claim 26 wherein said membrane is located a distance from said particulate filter sufficient to allow for about 30% expansion of said particulate filter.

28. An apparatus for removing contaminants from a liquid, said apparatus comprising:
   (a) a container having a bottom portion and a top portion, inlet means for introducing liquid from the outside of said container to the inside, header means for providing fluid communication between said inlet means, and a first outlet means;
   (b) a particulate filter disposed in said bottom portion of said container, said particulate filter comprising layers of at least two different particulate filter materials;
   (c) a reverse osmosis membrane supported in the upper portion of said container and located a sufficient distance from said particulate filter to provide for expansion of said particulate filter;
   (d) a first gas inlet means for introducing gas within said particulate filter material in said bottom portion of said container;
   (e) a second gas inlet means for introducing gas downstream of said membrane;
   (f) a second outlet means comprising a trough located downstream of said particulate filter and upstream of said membrane wherein said open interior portion of said trough faces said membrane and said closed exterior portion faces said particulate filter.

29. A method for purifying contaminated liquids, said method comprising:
   (a) passing a liquid through a particulate filter having an exposed surface;
   (b) passing said liquid through a membrane under pressure thereby resulting in the creation of back pressure forces; and
   (c) subjecting said exposed surface of said particulate filter to said back pressure forces.

30. The method of claim 29 wherein said membrane is a reverse osmosis membrane.

31. The method of claim 29 wherein said membrane is an ultrafiltration membrane.

32. The method of claim 29 wherein said liquid is passed through said membrane under pressures within the range of from about 30 to about 2000 pounds per square inch, gauge.

33. The method of claim 29 wherein said liquid is passed through said membrane under pressures ranging from about 30 to about 150 pounds per square inch, gauge.

34. The method of claim 29 wherein said contaminated liquid is introduced to a location within said particulate filter.

35. The method of claim 29 further comprising the step of withdrawing liquid which has passed through said membrane.

36. A method for cleaning an apparatus for purifying liquids comprising a particulate filter and a membrane, said method comprising:
   (a) introducing a cleaning liquid within a particulate filter having an exposed surface under a pressure sufficient to pass said cleaning liquid through said particulate filter but not through said membrane, wherein said particulate filter and said membrane are positioned within a single container;
   (b) causing said cleaning liquid to circulate through said particulate filter and around an inlet side of said membrane, said inlet side of said membrane facing said exposed surface of said particulate filter; and
   (c) removing said cleaning liquid from an area of said container located between said inlet side of said membrane and said exposed surface of said particulate filter.

37. The method of claim 36 further comprising the step of introducing a gas within said particulate filter wherein said gas passes through said particulate filter and said gas impinges upon said inlet side of said membrane.

38. The method of claim 36 further comprising the step of introducing a gas downstream of said membrane under pressure sufficient to pass said gas from the outlet side of said membrane to the inlet side of said membrane.

39. The method of claim 38 wherein said gas is selected from the group consisting of argon, carbon dioxide, air and mixtures thereof.

40. The method of claim 38 wherein said gas comprises air.

41. The method of claim 36 wherein said cleaning liquid comprises water.

42. A method for purifying a contaminated liquid, comprising:
   (a) passing said contaminated liquid through a particulate filter for removal of contaminants and yielding a first filtrate;
   (b) passing said first filtrate through an inlet side of a reverse osmosis membrane, controlling the flow of filtrate through said membrane to provide back pressure against said particulate filter resulting in uniform flow of said contaminated liquid through said particulate filter; and
   (c) recovering a second filtrate from an outlet side of said membrane.

43. A method according to claim 42 further comprising intermittantly passing a cleaning fluid containing gas through said particulate filter for scouring said particulate filter.

44. A method according to claim 42 in which the gas is selected from the group consisting of argon, carbon dioxide, air and mixtures thereof.

45. A method according to claim 42 further comprising introducing a gas downstream of said reverse osmosis membrane for dislodging contaminants in said reverse osmosis membrane.

46. An apparatus for purifying a contaminated liquid comprising:
   a container with a bottom section and a top section;
   a particulate filter located in said bottom section of said container for removal of contaminants;
   a reverse osmosis membrane with an inlet side and an outlet side located in said top section of said container for further removal of contaminants, and wherein said reverse osmosis membrane is located downstream of said particulate filter and positioned to provide back pressure against said particulate filter resulting in substantially uniform flow of said contaminated liquid through said particulate filter.

47. The apparatus of claim 46 further comprising a first means for distributing a gas into a cleaning fluid for passing through said particulate filter during cleaning cycles.

48. The apparatus of claim 46 further comprising a second means for distributing a gas for agitating fluid in and dislodging contaminants in said reverse osmosis membrane, and causing foaming to occur along the inlet side of said reverse osmosis membrane.

49. An apparatus for purifying water comprising:
- a container with a bottom section and a top section, a means for water inlet and a means for purified water outlet;
- a particulate filter located in said bottom section of said container for removal of contaminants from said water;
- a water distribution means located in the bottom section of said container to receive water from said means for water inlet and distribute said water underneath said particulate filter;
- a first means for gas distribution for introduction of gas during cleaning cycles located below said water distribution means;
- a reverse osmosis membrane with an inlet side and an outlet side located in the top section of said container for further removal of contaminants from said water, to provide back pressure against said particulate filter resulting in uniform flow of said water through said particulate filter;
- a second means for gas distribution located above said reverse osmosis membrane for dislodging contaminants in said reverse osmosis membrane and causing foaming to occur along said inlet side of said reverse osmosis membrane during cleaning cycles.

* * * * *